US010240987B2

(12) United States Patent
Bendani et al.

(10) Patent No.: US 10,240,987 B2
(45) Date of Patent: Mar. 26, 2019

(54) TEMPERATURE MEASUREMENT METHOD

(71) Applicant: Valeo Systemes de Controle Moteur, Cergy Saint Christophe (FR)

(72) Inventors: Larbi Bendani, Meru (FR); Mimoun Askeur, Vaureal (FR)

(73) Assignee: VALEO SYSTEMES DE CONTROLE MOTEUR, Cergy Saint Christophe (FR)

( * ) Notice: Subject to any disclaimer, the term of this patent is extended or adjusted under 35 U.S.C. 154(b) by 605 days.

(21) Appl. No.: 14/364,754

(22) PCT Filed: Dec. 11, 2012

(86) PCT No.: PCT/FR2012/052878
§ 371 (c)(1),
(2) Date: Jun. 12, 2014

(87) PCT Pub. No.: WO2013/088057
PCT Pub. Date: Jun. 20, 2013

(65) Prior Publication Data
US 2015/0010039 A1  Jan. 8, 2015

(30) Foreign Application Priority Data
Dec. 15, 2011  (FR) .................................. 11 61687

(51) Int. Cl.
*G01K 13/00* (2006.01)
*G01K 7/22* (2006.01)
*G01K 7/24* (2006.01)

(52) U.S. Cl.
CPC ............. *G01K 13/00* (2013.01); *G01K 7/22* (2013.01); *G01K 7/24* (2013.01)

(58) Field of Classification Search
CPC ..................... H02M 3/33553; H02M 3/33523
(Continued)

(56) References Cited

U.S. PATENT DOCUMENTS 3,863,501 A * 2/1975 Janssen ................. G01F 1/3263
73/861.24
4,148,220 A * 4/1979 Spofford ................. G01K 7/25
374/173

(Continued)

FOREIGN PATENT DOCUMENTS

DE  39 15 835 A1  3/1990
GB  1 507 268 A   4/1978
(Continued)

OTHER PUBLICATIONS

International Search Report issued in PCT/FR2012/052878 dated Apr. 8, 2013 (6 pages).

(Continued)

*Primary Examiner* — Gail Kaplan Verbitsky
(74) *Attorney, Agent, or Firm* — Osha Liang LLP

(57) ABSTRACT

The invention relates to a method for measuring the temperature of at least one electronic component (2) using a sensor (4) that supplies a temperature-dependent voltage. The method comprises the following steps in which: a signal representative of the voltage delivered by the sensor (4) is made to pass through an isolated differential amplifier (13), and the signal output from said isolated differential amplifier (13) is used to determine the temperature measured by the sensor (4).

12 Claims, 4 Drawing Sheets

(58) Field of Classification Search
USPC .......................................................... 702/99
See application file for complete search history.

(56) References Cited

U.S. PATENT DOCUMENTS

| | | | | |
|---|---|---|---|---|
| 4,178,594 | A * | 12/1979 | Senger | G01S 13/68 342/75 |
| 4,198,676 | A | 4/1980 | Varnum et al. | |
| 4,989,992 | A * | 2/1991 | Piai | G01K 7/021 307/117 |
| 5,267,569 | A * | 12/1993 | Lienhard | A61B 5/0424 324/71.1 |
| 6,063,234 | A * | 5/2000 | Chen | G01K 7/00 156/345.27 |
| 6,074,089 | A * | 6/2000 | Hollander | G01K 7/13 374/171 |
| 7,391,257 | B1 * | 6/2008 | Denison | A61B 5/0002 330/10 |
| 7,979,977 | B2 * | 7/2011 | Minteer | H01F 27/2804 29/602.1 |
| 8,098,470 | B2 * | 1/2012 | Raciti | H02H 1/0007 361/93.7 |
| 9,368,854 | B2 * | 6/2016 | Lopez | H01P 5/024 |
| 9,442,023 | B2 * | 9/2016 | Rollin | G01K 7/01 |
| 2006/0012378 | A1 * | 1/2006 | Yurgil | G01R 31/3679 324/548 |
| 2006/0047467 | A1 * | 3/2006 | Bedard | G01K 13/002 702/130 |
| 2007/0290692 | A1 * | 12/2007 | Peck | G01R 27/08 324/525 |
| 2009/0102459 | A1 * | 4/2009 | Werner | G01R 33/02 324/207.2 |
| 2009/0115564 | A1 * | 5/2009 | Minteer | H01F 27/2804 336/84 M |
| 2010/0145166 | A1 * | 6/2010 | Pickier | A61B 5/16 600/301 |
| 2012/0229219 | A1 * | 9/2012 | Lopez | H01P 5/024 330/307 |
| 2012/0250587 | A1 * | 10/2012 | Pandey | H04L 25/0272 370/276 |
| 2012/0286872 | A1 * | 11/2012 | Rozgo | G01D 18/004 330/279 |
| 2014/0269831 | A1 * | 9/2014 | Tang | G01K 7/00 374/170 |
| 2018/0017600 | A1 * | 1/2018 | Werker | G01R 15/181 |

FOREIGN PATENT DOCUMENTS

| | | | |
|---|---|---|---|
| JP | S50-110679 A | | 8/1975 |
| JP | S51121384 A | | 10/1976 |
| JP | H05180700 A | | 7/1993 |
| JP | H0862055 A | | 3/1996 |
| JP | 2007-531159 A | | 11/2007 |
| JP | 2008-508824 A | | 3/2008 |
| SU | 292106 A | * | 6/1975 |
| SU | 902207 A1 | * | 1/1982 |
| WO | WO 03055061 A1 | * | 7/2003 ............... H01G 5/16 |

OTHER PUBLICATIONS

Notification of Reasons for Refusal issued in corresponding Japanese Patent Application No. 2014-546613, dated Nov. 9, 2016 (9 pages).

* cited by examiner

TEMPERATURE MEASUREMENT METHOD

The present invention relates to temperature measurement using a sensor arranged in a high voltage environment. The sensor is, for example, located on a printed circuit board bearing power components. These power components form, for example, part of an inverter, as depicted in FIG. 1.

Figure 1:
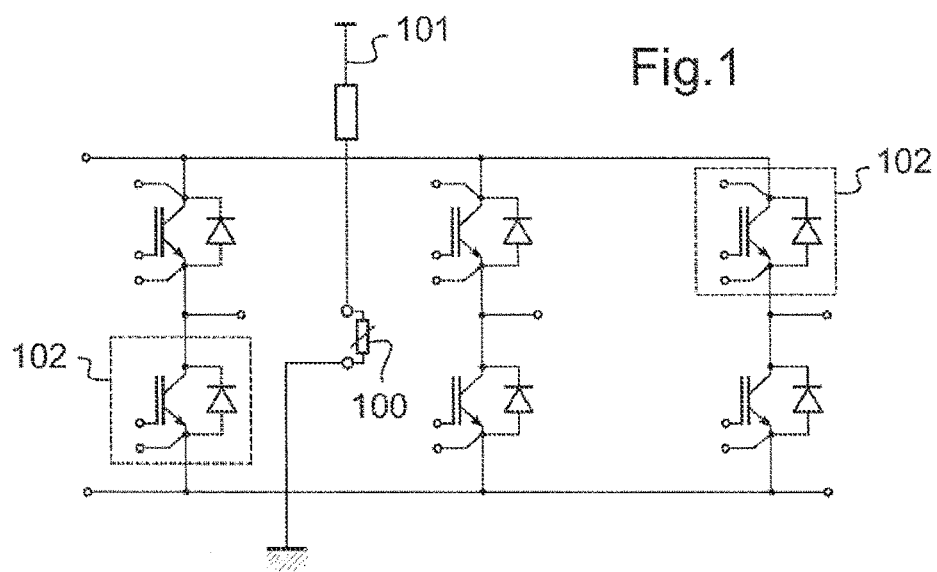

In this FIG. 1, it can be seen that the sensor 100 which here is a negative temperature coefficient thermistor (still referred to as a CTN in English) is supplied by a voltage source 101 delivering a low voltage, e.g. of the order of 5 V. This sensor 100 is arranged on the same substrate as the switching cells 102 of the power inverter, each of these cells 102 being, for example, dimensioned for withstanding voltages of 430 V and currents of a maximum value of 350 A. Isolation between the high voltage circuit of the inverter and the low voltage circuit of the sensor 100 is ensured by means of a silicone gel covering the substrate. This isolation withstands voltages of the order of 1.5 kV. Nevertheless, the electrical isolation provided by the gel is not sufficient if a higher voltage is applied between the high voltage circuit and the low voltage circuit, which may occur in the event of an incident in the high voltage circuit.

For protecting the sensor 100, it may then be necessary to add one or more additional isolating barriers, which may be costly in space and money.

There is a need for performing an isolated temperature measurement in a high voltage environment by protecting the sensor from any incident in the high voltage circuit.

The subject matter of the invention relates to responding to this need and it succeeds in this, according to one of its aspects, using a method of measuring the temperature of at least one electronic component, in particular a component belonging to a high voltage circuit and supplied with high voltage, with a sensor, in particular supplied with low voltage, and delivering a voltage according to said temperature, a method in which:

- a signal representative of the voltage at the sensor terminals is passed through an isolated differential amplifier, and
- the output signal from this isolated differential amplifier is used to determine the temperature of the electronic component.

According to the above method, the galvanic isolation of the isolated differential amplifier is used for protecting the temperature sensor. The differential amplifier is said to be 'isolated' due to this galvanic isolation.

The above method may use a measurement circuit of which the part upstream of the isolated differential amplifier input is in a high voltage environment and of which the part downstream of the isolated differential amplifier output is in a low voltage environment. Galvanic isolation is thus used to isolate these two parts of the measurement circuit. The isolation of the differential amplifier may be of the capacitive type. As a variant, it may be an isolation of the inductive type.

The differential amplifier may fulfill other functions, e.g. bringing the value of the voltage originating from the temperature sensor into an acceptable range of values for a digital processing stage, e.g. bringing the input voltage of this processing stage to a value between 0 and 5 V, so as to avoid adding a component dedicated to implementing galvanic isolation. The invention may thus be used to reduce the space requirement and the cost associated with the implementation of galvanic isolation by best use of the components already present.

The isolation provided by the isolated differential amplifier may be used to withstand a peak voltage of 4 kV. This isolation can be assessed according to the standard UL 1577 or IEC 60747-5-2.

The high voltage circuit is, for example, supplied with a voltage source delivering a voltage between 0 and 430 V, being in particular of the order of 430 V.

The temperature sensor is in particular supplied from a voltage between 4.5 V and 5.5 V, being in particular of the order of 5 V, this voltage being isolated from the high voltage environment.

The method may comprise a step consisting in obtaining a linear relationship between the voltage at the sensor terminals and the temperature that it measures. This step may be implemented by a linearization stage upstream of the isolated differential amplifier input. The linearization stage may include a resistance bridge mounted between the ground and the voltage source of the temperature sensor. Such a structure can be used to obtain a differential voltage for the isolated differential amplifier.

When the temperature sensor has a resistance that varies exponentially according to temperature, as is the case for a negative temperature coefficient thermistor, the voltage value that it delivers may be difficult to use. The linearization step renders the measurements more usable.

The linearization stage may include a resistor at the temperature sensor terminals having a value equal to the value of the resistance of the temperature sensor when the temperature is 50° C.

Due to the linearization, it is not necessary to use an isolated differential amplifier with an overly large range of input voltage.

Linearization can still be used to be able to measure the temperature when the sensor is supplied by very low currents. For obtaining a linear relationship, including for low temperatures, typically of the order of −30° C., the value of the resistance of the temperature sensor for these low temperatures, typically −30° C., may be imposed on the resistor at the temperature sensor terminals.

The output signal from the linearization stage is, for example, a voltage of the order of a few mV, ranging, for example, up to 5 mV.

As a variant, the method may lack this linearization step.

The output signal from the isolated differential amplifier may be received as the input of a ground-referenced comparator.

The output signal from the comparator may be received as the input of a processing stage used to determine the temperature measured by the sensor. This processing stage may include an analog/digital converter and a digital processing unit. The digital processing unit includes in particular at least one microcontroller or at least one microprocessor.

The isolated differential amplifier may include a system limiting the input current of said amplifier and a system limiting the output current of said amplifier. Thus the risk of damage to the isolation can be reduced in the event of excessive currents at the input or output of the isolated differential amplifier, these excessively high current values being capable of causing significant dissipation of heat in resistors which may affect the isolation.

The sensor and the isolated differential amplifier may be installed on the same printed circuit board.

The printed circuit board may further include the electronic component or components the temperature of which is to be measured. These electronic components in particular each have a nominal power greater than or equal to 1 kW.

These are, for example, switching cells of an inverter. These switching cells may include a power transistor with which a diode is mounted in parallel. The inverter may form part of an inverter/charger circuit further including an electric motor and a battery, this circuit being integrated into an electric or hybrid vehicle.

The subject matter of the invention is also, according to another of its aspects, a circuit for measuring temperature from the voltage delivered by a temperature sensor, the circuit including:
- an isolated differential amplifier, receiving as input a voltage representative of the temperature measured by the sensor, and
- a processing stage configured for determining the temperature measured according to the output signal from the isolated differential amplifier, the isolated differential amplifier implementing a galvanic isolation between its input and its output.

The subject matter of the invention is also, according to another of its aspects, a system including:
- the circuit above, and
- a temperature sensor.

Figure 2:
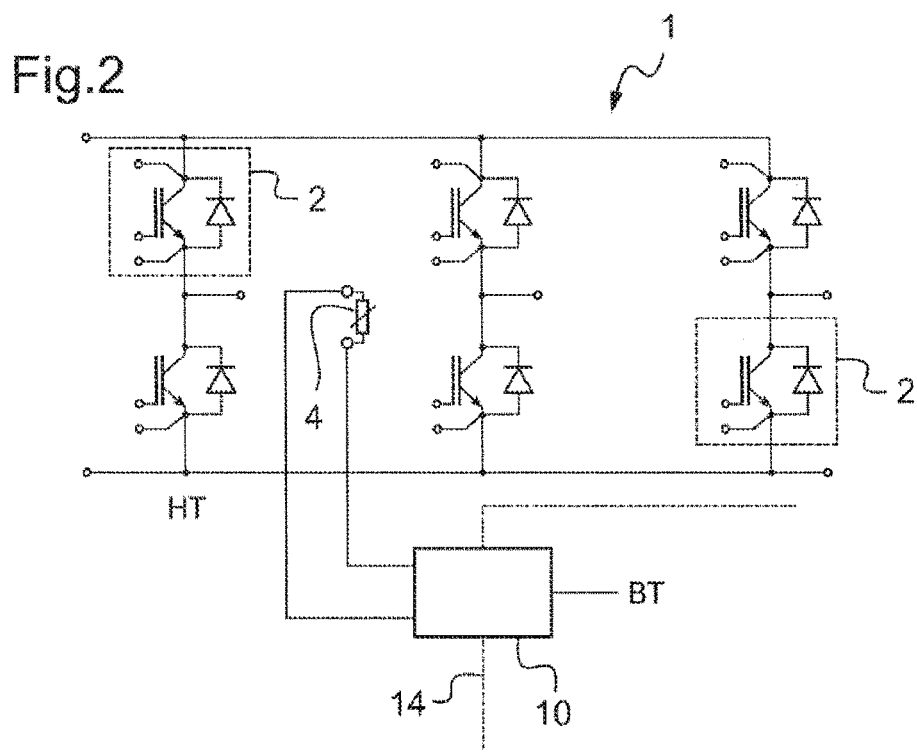
Figure 4:
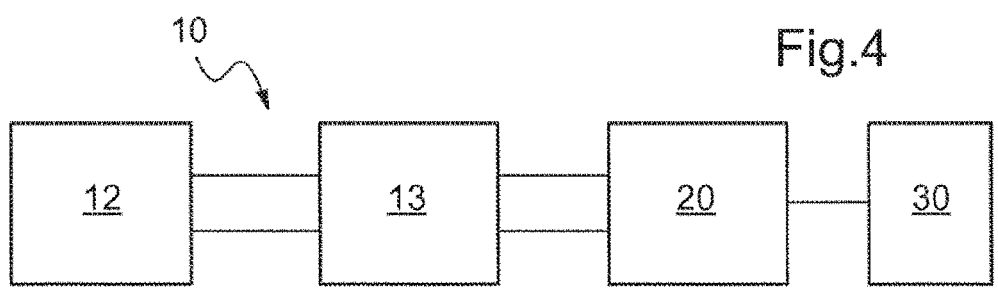
Figure 3:
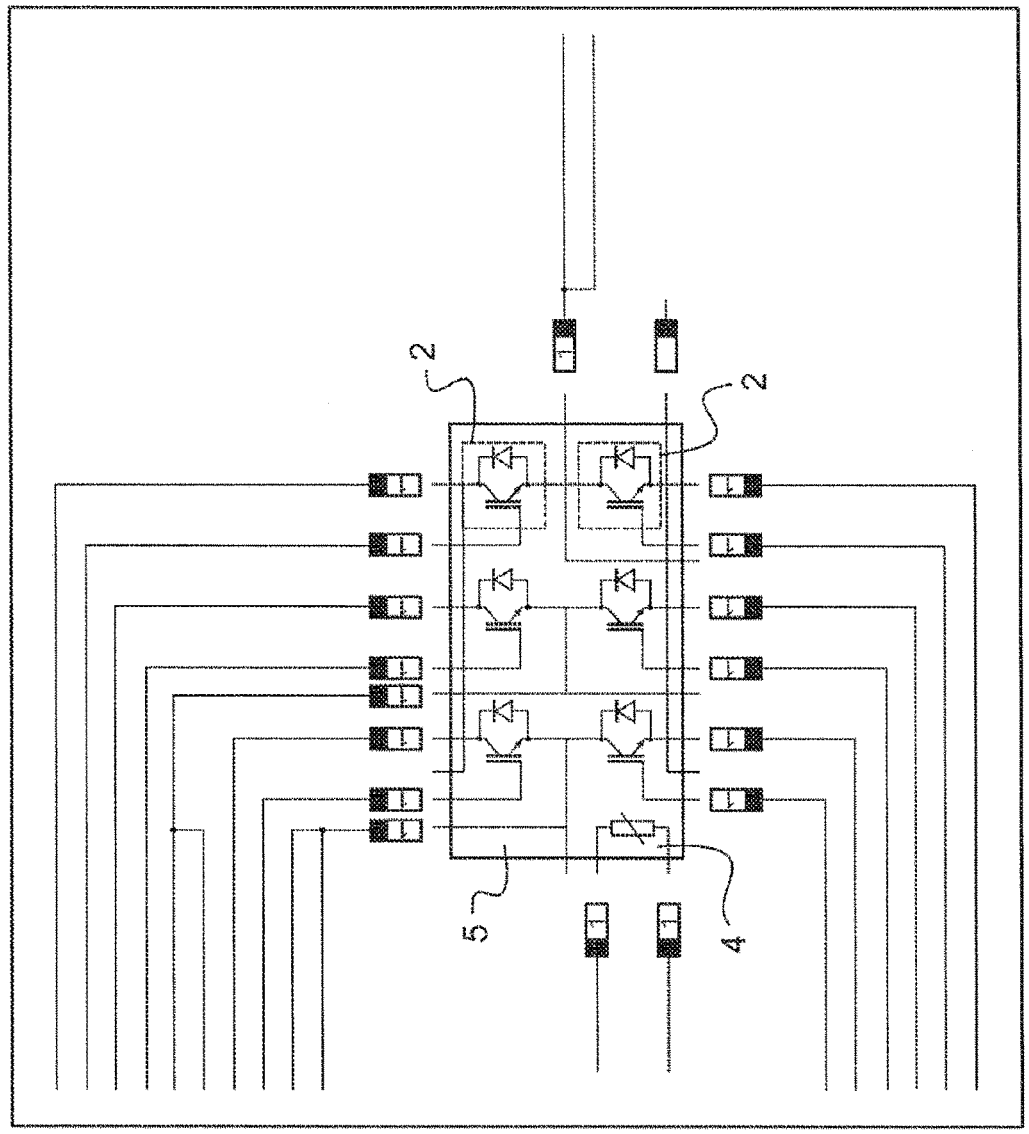
Figure 5:
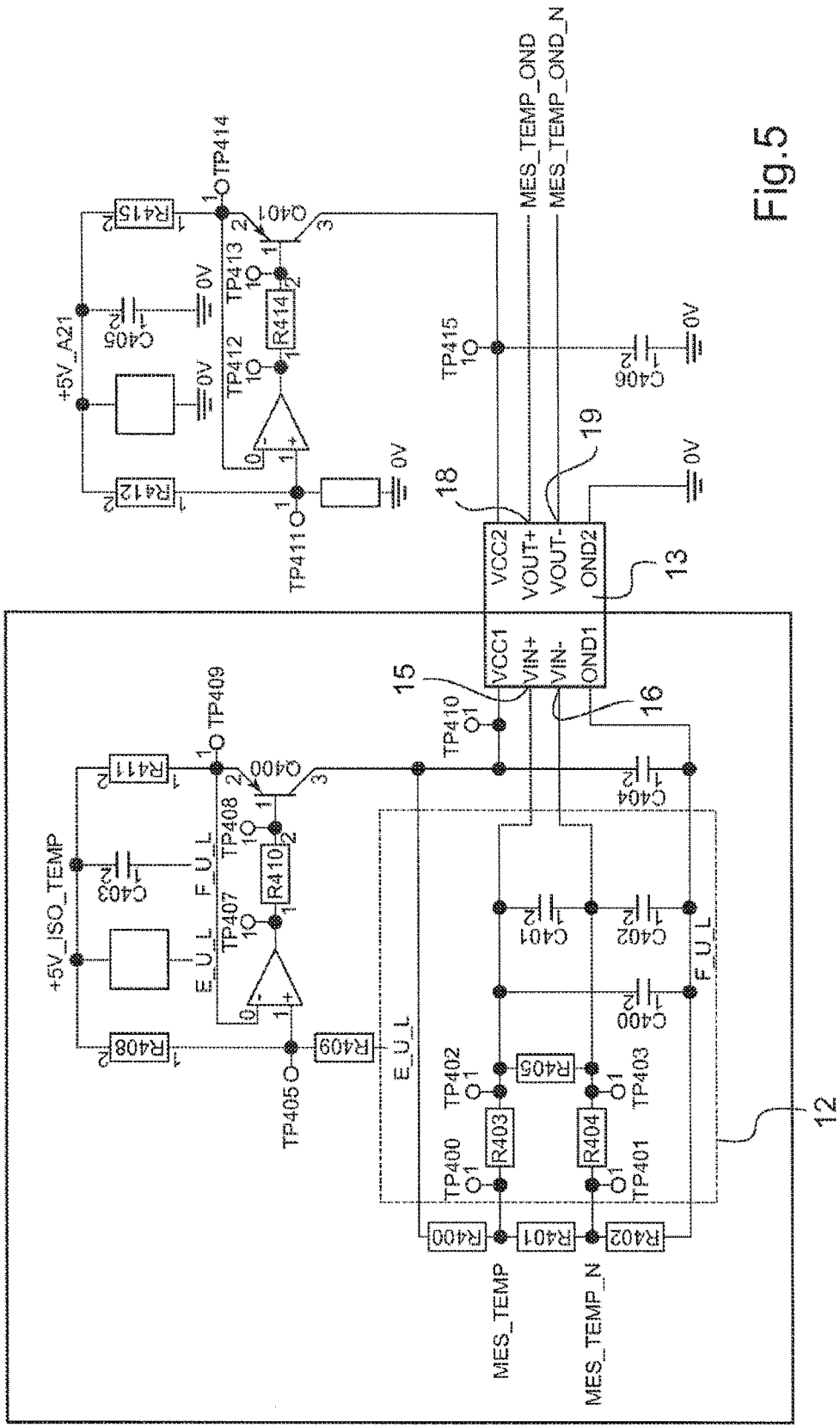
Figure 6:
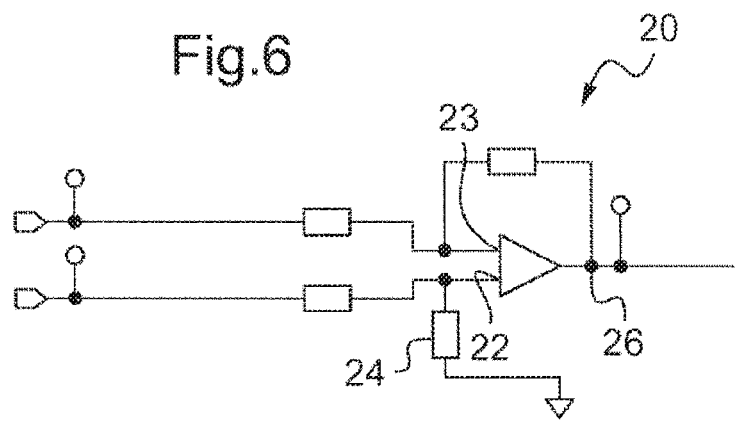
Figure 7:
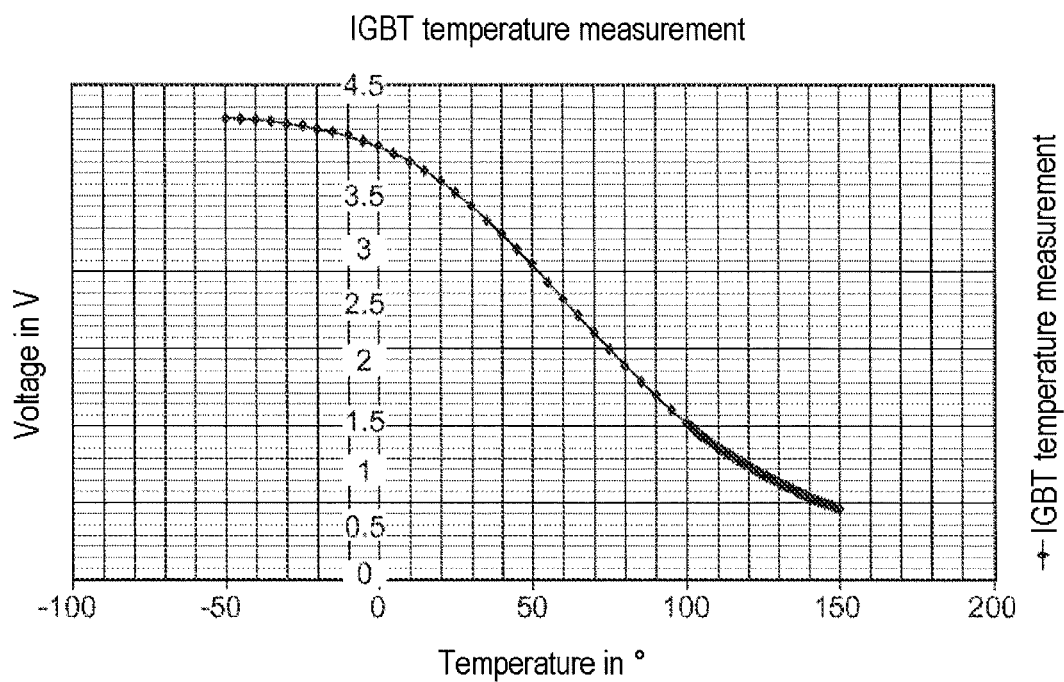

The invention may be better understood on reading the following description of a non-restrictive example of implementation thereof and on examining the accompanying drawing in which:

FIG. 1 depicts a printed circuit board on which a temperature measurement is performed according to the prior art, FIG. 2 depicts a printed circuit board on which a temperature measurement is performed according to an example of implementation of the invention, FIG. 3 depicts in detail the temperature sensor and components whereof it measures the temperature, FIG. 4 depicts in the form of functional blocks a measurement circuit according to an example of implementation of the invention, FIGS. 5 and 6 depict different blocks of the circuit in FIG. 4 in a structural way and FIG. 7 is a curve showing the relationship between the temperature and the voltage at the sensor terminals after linearization.

FIG. 2 depicts an assembly 1 within which the method according to an example of embodiment of the invention may be implemented. This assembly 1 includes an inverter including a plurality of switching cells 2. Each switching cell 2 in the example considered is formed by the combination in parallel of a transistor, e.g. a field effect transistor, and a diode. Each transistor in the example described is a MOS transistor. The inverter depicted in FIG. 2 includes three branches each having two switching cells 2.

Each cell 2 is, for example, configured for withstanding a current from the order of about ten amperes, in particular up to 350 A, and a voltage at its terminals of a few hundred volts, e.g. 430 V. In the example considered the inverter belongs to a high voltage circuit.

As can be seen, a temperature sensor 4 is arranged at the level of the inverter, between two branches thereof. The temperature sensor 4 here is a negative temperature coefficient thermistor (CTN in English). This sensor 4 is supplied by a voltage source delivering a voltage of the order of 4.5 V to 5.5 V, i.e. a low voltage, through a measurement circuit 10 which will be described later. The circuit 10 supplies the sensor 4 with a low voltage isolatedly with respect to the high voltage of the inverter.

The sensor 4 is configured for measuring the temperature of at least one of the switching cells 2.

The sensor 4 and the inverter are, in the example considered, carried on the same medium, such as a printed circuit board 5.

The voltage measured at the sensor 4 terminals is, as depicted in FIG. 3, received at the input of the circuit 10.

The circuit 10 is depicted in a functional manner in FIG. 4, the various functions having the form of blocks that may correspond to the steps of the method according to the invention.

The circuit 10 includes a linearization stage 12 depicted in detail in FIG. 5. This stage 12 is configured for establishing a linear relationship between the voltage supplied by the sensor 4 and the temperature of the cell or cells 2. Stage 12 acts, for example, as a voltage attenuator with a ratio chosen so that the voltage at the input of stage 13 which will be described later is compatible with the operation of this stage 13. Stage 12 includes, for example, a resistance bridge mounted between the ground and the power supply of the sensor 4.

A resistor mounted in parallel with the sensor 4 may have a substantially constant value equal to the value of the resistance of the sensor 4 when the temperature is approximately 50° C. A linear relationship between the voltage at the sensor 4 terminals and the temperature can thus be obtained over a temperature range in particular between 50° C. and 125° C. The overall resistance value for the resistance bridge can be calculated by setting a cold value for cold, e.g. at −30° C., close to 250 mV and a hot value, e.g. at 125° C., close to 5 mV, these voltage values being seen from stage 13. FIG. 7 depicts the relationship between the output voltage of the linearization stage 12 and the temperature measured by the sensor 4.

As can be seen, a substantially linear relationship is obtained over a wide temperature range, in particular for temperatures between 50° C. and 120° C.

The output signal from the linearization stage 12 is received as the input of a stage 13 having the function of galvanically isolating the sensor 4 and the portion of the circuit 10 upstream of the input of stage 13 from the rest of the circuit 10. This stage 13, in the example considered, consists of an isolated differential amplifier.

The output signal from the linearization stage is then received between two input terminals 15 and 16 of the isolated differential amplifier. The galvanic isolation 14, e.g. of the capacitive or inductive type, supplied by this differential amplifier is used for performing an isolated temperature measurement. The isolated differential amplifier is, for example, marketed by the Texas Instruments® company under reference AMC1200.

In this example, the galvanic isolation 14 stems from a silicon dioxide barrier arranged between the input and the output of the differential amplifier. The signal leaves the isolated differential amplifier between the non-inverting output terminal 18 and the inverting output terminal 19 of this amplifier.

The signal then drives a comparison stage 20 depicted in FIG. 6. In the example considered this stage 20 includes an operational amplifier. The non-inverting output terminal 18 of the differential amplifier is, for example, connected, directly or via an intermediate component such as a resistor, to the non-inverting input terminal 22 of the operational amplifier. In the example depicted this terminal 22 is also connected to the ground via a resistor 24. Still in the example in FIG. 6, the inverting output terminal 19 of stage 13 is connected via a resistor to the inverting output terminal 23 of the operational amplifier.

Stage 20 is used in particular to ground-reference the signal from the sensor 4. The output of stage 20 is formed by the output terminal 26 of the operational amplifier.

The output signal from stage 20 then drives a processing stage 30 for determining the temperature measured by the sensor 4. This stage 30 includes, for example, an analog/digital converter and a microcontroller or a microprocessor.

The invention is not limited to the examples that have just been described.

The circuit 10 may in particular not include all the stages depicted in FIG. 4, when it includes stage 13 for isolating the part of the circuit 10 upstream of stage 13 from the part of the circuit 10 downstream of this stage 13.

The expression 'comprising one' should be understood as meaning 'comprising at least one', unless otherwise specified.

The invention claimed is:

1. A method of measuring a temperature of at least one electronic component using a sensor delivering a voltage according to said temperature, comprising:
   passing a signal representative of the voltage delivered by the sensor through an isolated differential amplifier, the isolated differential amplifier comprising a galvanic isolation barrier traversed by said signal;
   determining, based on the output signal from the isolated differential amplifier, the temperature of the electronic component; and
   linearizing a relationship between the voltage delivered by the sensor and the temperature of the electronic component upstream of the isolated differential amplifier,
   wherein linearizing is caused by a resistance bridge mounted between a ground and a voltage source of the sensor.

2. The method as claimed in claim 1, wherein the output signal from the isolated differential amplifier is received as the input of a ground-referenced comparator.

3. The method as claimed in claim 2, wherein the output signal from the comparator is received as the input to a processing stage.

4. The method as claimed in claim 3, wherein the processing stage includes an analog/digital converter and a digital processing unit.

5. The method as claimed in claim 1, wherein the galvanic isolation provided by the isolated differential amplifier is of the capacitive or inductive type.

6. The method as claimed in claim 5, wherein the sensor and the isolated differential amplifier are installed on a same printed circuit board.

7. The method as claimed in claim 6, the printed circuit board further comprising the electronic component or components the temperature of which is measured, each of said components having a nominal power greater than or equal to 1 kW.

8. The method as claimed in claim 1, wherein, for determining the temperature of the electronic component, a measurement circuit is used of which the part upstream of the isolated differential amplifier input is in a high voltage environment and of which the part downstream of the isolated differential amplifier output is in a low voltage environment.

9. The method as claimed in claim 1, wherein linearizing the relationship includes imposing a resistance value of the sensor on a resistor at a terminal of the sensor.

10. A circuit for measuring temperature from the voltage delivered by a temperature sensor, the circuit comprising:
    an isolated differential amplifier, receiving as input a voltage representative of the temperature measured by the sensor; and
    a processing stage configured for determining the temperature measured according to the output signal from the isolated differential amplifier, wherein
    the isolated differential amplifier comprising a galvanic isolation barrier between its input and its output,
    the relationship between the voltage delivered by the sensor and the temperature of an electronic component measured by the temperature sensor is linearized upstream of the isolated differential amplifier in the circuit, and
    the linearization is caused by a resistance bridge mounted between a ground and a voltage source of the sensor.

11. A system, including:
    the circuit as claimed in claim 10; and
    a temperature sensor.

12. The circuit as claimed in claim 10, wherein the linearization includes imposing a resistance value of the sensor on a resistor at a terminal of the sensor.

* * * * *